(12) United States Patent
Takessian

(10) Patent No.: US 6,769,270 B2
(45) Date of Patent: Aug. 3, 2004

(54) DETACHABLE PENDANT MOUNTING

(76) Inventor: Korabet Takessian, 41721 Hanford Rd., Canton, MI (US) 48187

( * ) Notice: Subject to any disclaimer, the term of this patent is extended or adjusted under 35 U.S.C. 154(b) by 7 days.

(21) Appl. No.: 09/812,501

(22) Filed: Mar. 20, 2001

(65) Prior Publication Data

US 2001/0045105 A1 Nov. 29, 2001

Related U.S. Application Data

(60) Provisional application No. 60/190,777, filed on Mar. 20, 2000.

(51) Int. Cl.$^7$ ............................................. A44C 17/02
(52) U.S. Cl. .............................. 63/29.1; 63/23; 63/26; 24/3.4; 24/598.2; 24/710
(58) Field of Search ............................. 63/29.1, 23, 26; 70/459; 24/3.4, 3.13, 598.2, 709.8, 710, 601.7, 3.6

(56) References Cited

U.S. PATENT DOCUMENTS

| | | | | |
|---|---|---|---|---|
| 2,760,247 A | * | 8/1956 | Bagnasco | 24/708.7 |
| 3,733,852 A | * | 5/1973 | Johnson et al. | 63/37 |
| 3,806,997 A | * | 4/1974 | Niwa | 24/709.9 |
| 3,883,930 A | * | 5/1975 | Bagnasco | 24/708.9 |
| 5,031,420 A | * | 7/1991 | Song | 63/21 |
| 5,755,017 A | * | 5/1998 | Montaquila | 24/499 |
| 6,381,985 B1 | * | 5/2002 | Burgard | 63/29.1 |

* cited by examiner

Primary Examiner—William L. Miller
Assistant Examiner—Dinesh Melwani
(74) Attorney, Agent, or Firm—John R. Benefiel

(57) ABSTRACT

A detachable pendant mounting for providing interchangeability of the pendant includes a hollow clasp housing held on a pendant chain, the clasp housing open at the rear and the bottom end. A clasp element is mounted within the clasp element accessible through the open rear. A pendant securement to the clasp element is accomplished through the bottom opening. The clasp element may take various forms including a deflectable hook, a fixed pin, a slotted clevis, etc., with a catch engagement keeping the pendant securement on the clasp element until released.

6 Claims, 3 Drawing Sheets

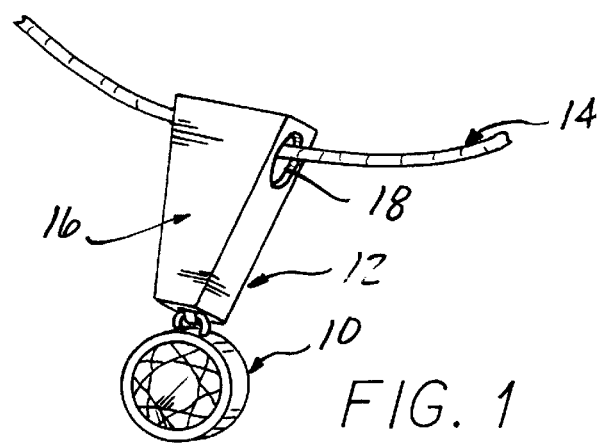
FIG. 1
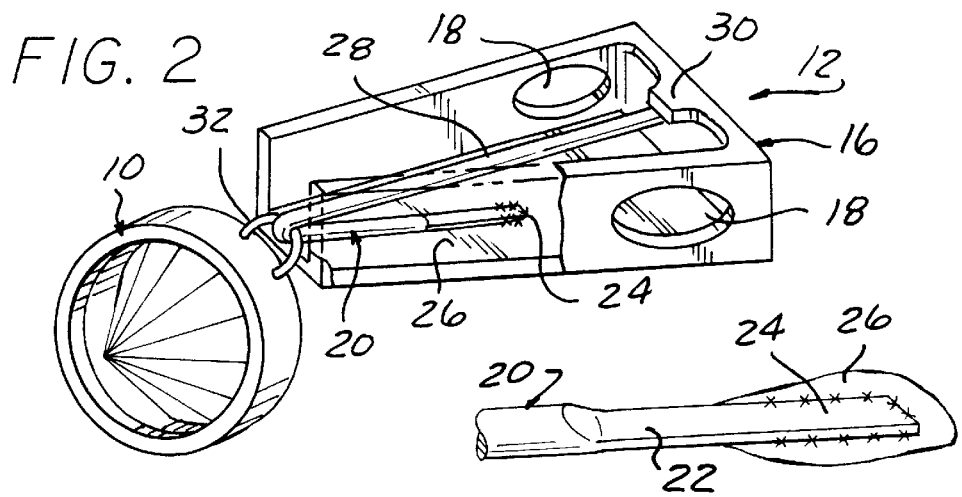
FIG. 2
FIG. 2A
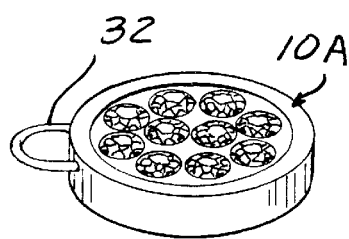
FIG. 4
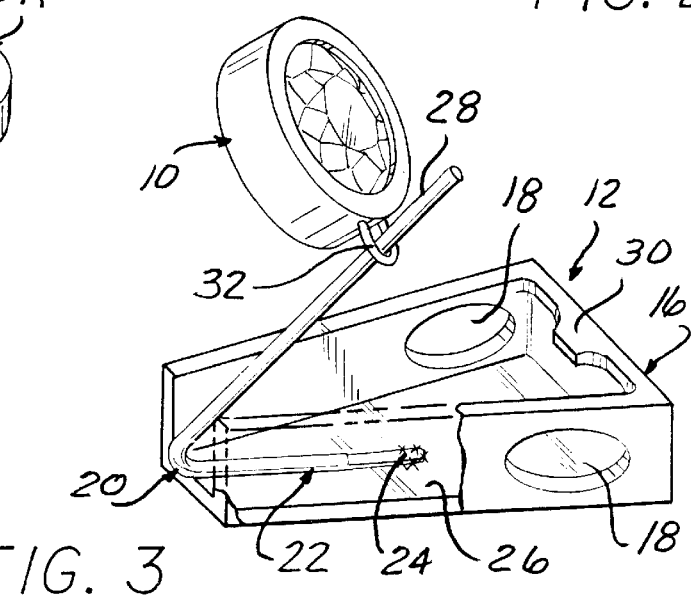
FIG. 3

DETACHABLE PENDANT MOUNTING

CROSS REFERENCE TO RELATED APPLICATION

This application claims the benefit of U.S. provisional Serial No. 60/190,777, filed Mar. 20, 2000.

BACKGROUND OF INVENTION

This invention concerns body worn ornamentation and particularly pendant ornaments attached to a chain. Most ornaments require detachment of the chain ends to replace an ornament, and often the pendant is permanently attached to the chain to require the services of a jeweler to detach. It would be desirable to be able to more easily change the ornament than with the prior art arrangements. It is critical that any detachable mounting be very secure even after long use to insure that precious stones are not lost due to a failure of the means for attaching the pendant.

It is the object of the present invention to provide a pendant ornament which has a self contained detachable mounting for providing interchangeability of the pendant which very securely retains the pendant even after many pendant changes have been made.

SUMMARY OF THE INVENTION

The above object and others which will become understood upon a reading of the following specification and claims are achieved by a jewelry piece having an ornamental pendant and a pendant mounting including an ornamental hollow clasp housing from which the pendant is suspended.

Openings on either side of the top of the housing are provided to allow stringing the housing onto a supporting chain. A deflectable or hinged clasp element is mounted within the clasp housing and extends down to an open end of the clasp housing. The clasp housing is open at the back to allow the clasp element to be accessed to be released from a catch and to allow a loop or other pendant securement affixed to the pendant to be slid onto the clasp element which is then reengaged with the catch.

The pendant is then secured to the bottom end of the clasp housing, ready for convenient interchangeability with other pendants at any time.

The clasp element can take various forms including that of a resiliently deflectable or hinged hook receiving a loop fixed on the pendant, a slotted clevis which receives a mating pendant stem, or a headed pin fixed to the clasp housing.

DESCRIPTION OF THE DRAWINGS

FIG. 1 is a perspective view of a pendant and pendant mounting according to the invention, with fragmentary portions of a chain secured to a clasp housing facing a part of the pendant mounting.

FIG. 2 is a perspective enlarged view of the reverse side of the pendant and pendant mounting shown partially broken away.

FIG. 2A is a perspective further enlarged fragmentary view of a hook element showing the flattened shape of the shank portion thereof soldered to the inside of the clasp housing.

FIG. 3 is a perspective reverse view of the pendant and pendant mounting showing a released hook element and the pendant being removed therefrom.

FIG. 4 is a perspective view of a multistone pendant of a type able to be attached to the detachable pendant mounting according to the invention.

DETAILED DESCRIPTION

Figure 5:
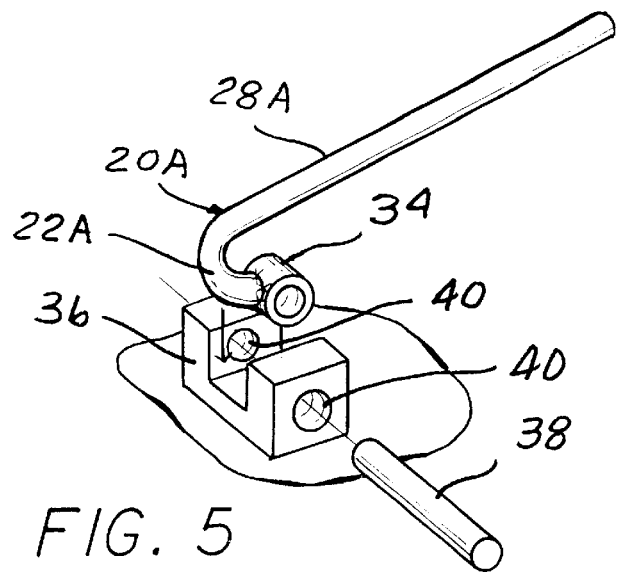
FIG. 5 is a perspective view of an alternate hinged embodiment of the hook form of the clasp element included in the detachable pendant mounting according to the invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIGS. 1–3, a jewelry piece including a bezel mounted pendant 10 is shown on a detachable pendant mounting 12 according to the invention, which in turn is held on a decorative neck chain 14. The mounting 12 could also be held on a bracelet chain, pin, etc.

The detachable pendant mounting 12 includes an ornamental clasp housing 16 of silver or other precious metal suitable for jewelry, which takes the form of a hollow, open in the back tapered piece. A pair of side openings 18 at the top of side walls defining the hollow shape receive the chain 14.

A clasp element is mounted within the clasp housing 16, here taking the form of a wire hook 20. The wire hook 20 has a shank portion 22 hammered into a flat strip to be resiliently bendable, shank portion 22 soldered at its top 24 to the rear inside face 26 of the clasp housing 16.

A deflectable hook segment 28 has its tip captured by a catch 30, the deflected condition insuring a frictional securement beneath the catch 30. The flat shank portion 22 insures that even with many pendant changes the wire hook does not become deformed to lose its tight engagement with the catch 30.

The pendant 10 has an affixed loop or ring 32 captured on the hook 20 as shown in FIGS. 1 and 2.

FIG. 3 shows that by uncatching the tip of the hook portion 28, which is access through the open back of the clasp housing, the pendant 10 can be slid off the hook 20 for replacement.

FIG. 4 shows a multistone version of the pendant 10A with a loop 32 for attachment to the detachment mounting described.

FIG. 5 shows a hook 20A which has its hook segment 28A hinged by being mounted in a small clevis 36 receiving a collar 34 affixed to the much shortened shank portion 22A. A hinge pin 38 is pressed into clevis holes 40, capturing the collar 34. The hook segment 28A can be swung up after being deflected sideways to be disengaged from the catch 30 to allow the pendant to be removed. When the hook segment 28A is released after being positioned below the catch 30 and deflected sideways to clear the catch 30, the segment 28A returns to its original condition held behind the catch 36.

Figure 6:
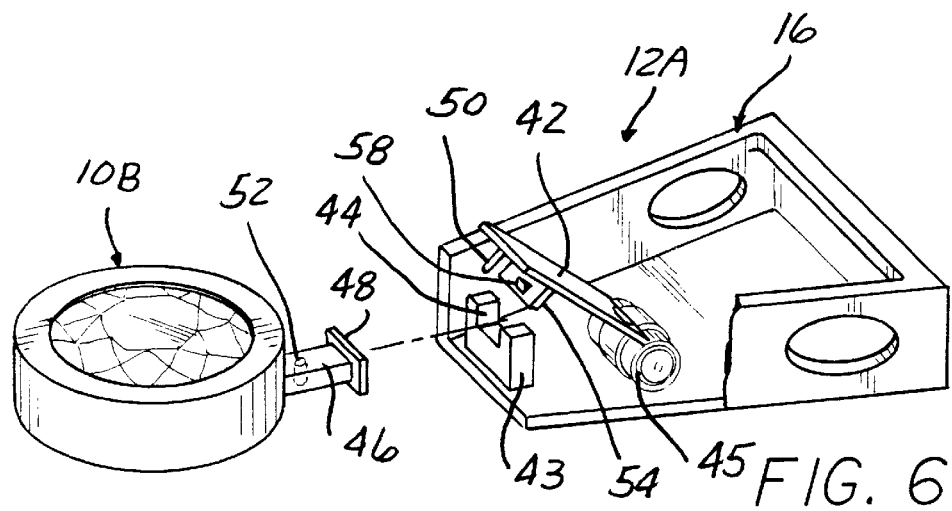
FIG. 6 is an enlarged exploded perspective view of another embodiment of the detachable pendant mounting according to the invention.
Figure 7:
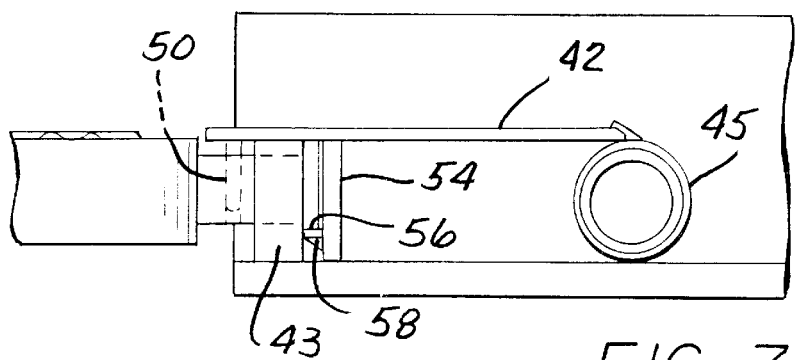
FIG. 7 is an enlarged, partially sectional fragmentary side view of the mounting and pendant shown in FIG. 6.

FIGS. 5 and 6 show another embodiment of the detachable mounting 12A which includes a clasp element taking the form of a strap 42 hinged at one end 45 to be swingable up and down, towards and away from a catch piece 43 fixed to the rear surface of the clasp housing 16.

The catch piece 43 has a slot 44 which receives a corresponding rectangular in section stem 46 affixed to the pendant 10B. A ridge 48 on stem 46 prevents endwise movement out of the slot 44. The strap 42 has a locking pin 50 which moves into a hole 52 in the stem 46 and a dependent element 54 has a protrusion 58 snapping over a retention feature 56 on the rear face of the catch 43 when the hinge strap 42 is swung down, the pendant 10B thereby detachably mounted to the lower open end of the clasp housing 16.

Figure 8:
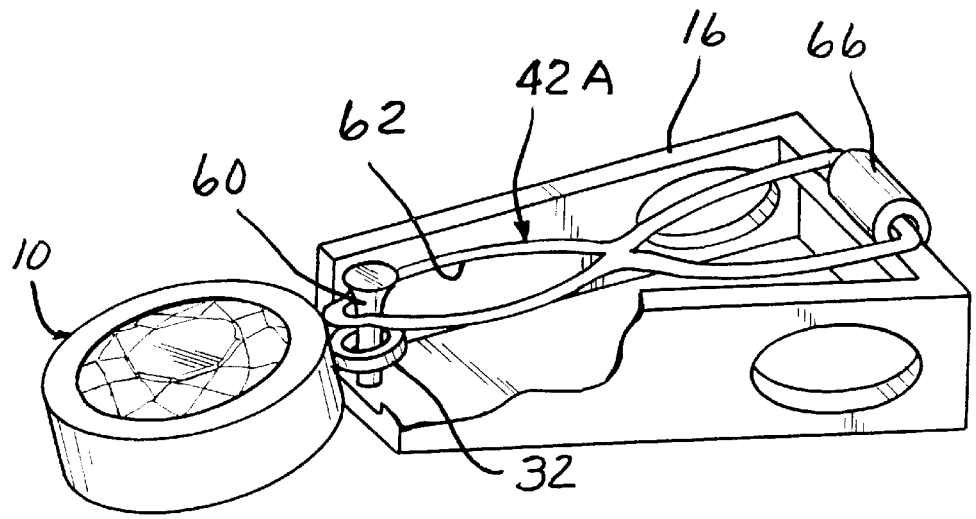
FIG. 8 is an enlarged and fragmentary rear perspective view of yet another embodiment of the detachable pendant mounting according to the invention, having a pendant attached thereto.
Figure 9:
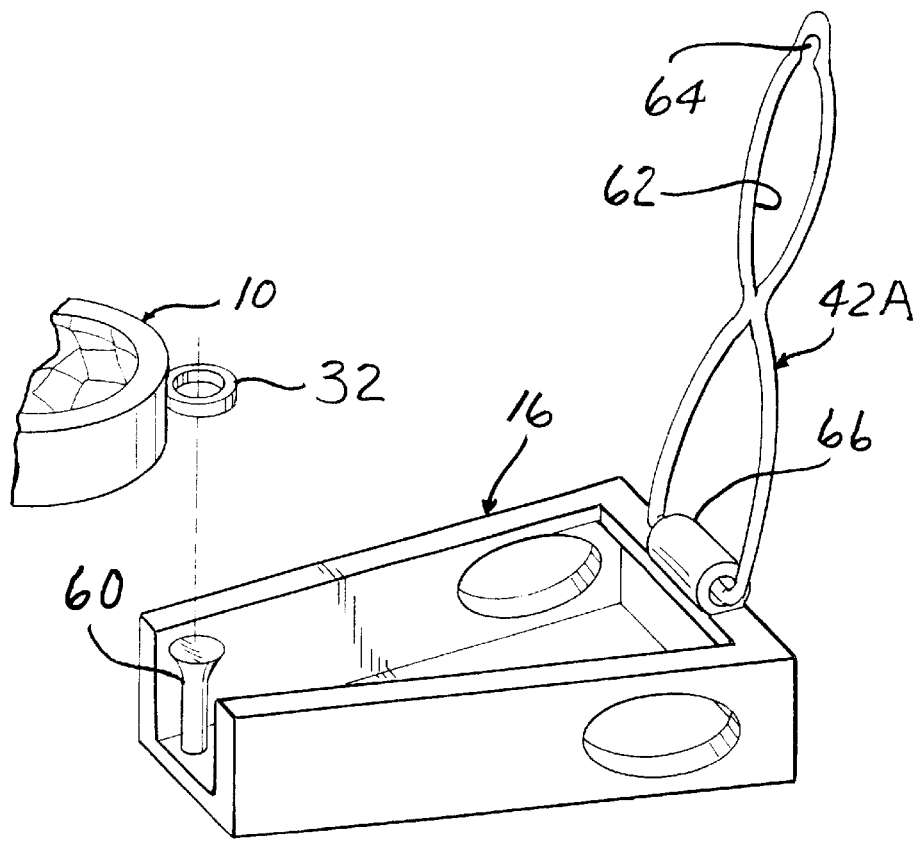
FIG. 9 is a perspective view of the embodiment shown in FIG. 8 but with the pendant detached.

FIGS. 8 and 9 show yet another embodiment, where an elongated hoop 42A has one end held by a hinge 66 attached to rear top of the clasp housing 16.

A headed catch pin 60 fixed to the lower end of the clasp housing 16 snap fits to the lower part 64 of an opening 62 in the strap 42A when the strap 42A is swung down. The pendant ring 32 is receivable over the pin 60 and is secured thereon when the strap 42A is snapped over the head of the pin 60.

The forward side of the clasp housing 16 is attractive and provides an ornamental concealment of the various clasp mechanisms possible.

What is claimed is:

1. A jewelry piece including a detachable pendant mounting for providing interchangeability of an ornamental pendant included in said jewelry piece, comprising:

a hollow clasp housing defined by a front, top and a pair of side walls, said clasp housing having an opening at the rear and the bottom;

a clasp element mounted within said hollow clasp housing and receiving a pendant loop attached to said pendant, said clasp clement accessible through said open rear of said clasp housing;

said clasp element comprising a hook having a movable outer segment receiving said pendant loop, said outer segment having an upper end engageable beneath a catch feature fixed to said hollow clasp housing, said hook having a reverse angled portion at a lower end adjacent said bottom opening in said hollow clasp housing holding said pendant loop also thereby positioned adjacent said bottom opening;

said clasp element enclosed to be concealed within said hollow clasp housing with said hook outer segment upper end of said clasp element in engagement with said catch feature so as to not be viewable from the front, top, and sides of the hollow clasp housing.

2. The jewelry piece according to claim 1 wherein said hook includes a shank portion having an end soldered to an inside face of said clasp housing, said outer segment and said shank portion resiliently deflectable to move said end of said outer segment behind said catch feature, located at the top of said clasp housing, said shank portion joined at a reverse angle to said outer segment to form said reverse angled portion.

3. The jewelry piece according to claim 2 wherein said shank portion is flattened to enhance the resilient deflectability thereof.

4. The jewelry piece according to claim 1 wherein said clasp housing is of a tapering shape wider at the top.

5. The jewelry piece according to claim 4 wherein a pair of side walls and a top wall define said hollow shape of said clasp housing, a pair of aligned holes each formed in a respective one of said side walls adjacent said top wall of said clasp housing, said holes receiving a holding chain also included in said jewelry piece.

6. The jewelry piece according to claim 1 wherein said clasp housing is formed of a precious metal.

* * * * *